US006411433B1

United States Patent
Miyoshi (12) 
(10) Patent No.: US 6,411,433 B1
(45) Date of Patent: Jun. 25, 2002

(54) MICROMANIPULATOR

(75) Inventor: Takashi Miyoshi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/249,672

(22) Filed: Feb. 12, 1999

(30) Foreign Application Priority Data

Feb. 23, 1998 (JP) .......................................... 10-040391

(51) Int. Cl.[7] .............................................. G02B 21/34
(52) U.S. Cl. ...................................... 359/396; 359/368
(58) Field of Search ................................ 359/391, 393, 359/396, 368; 250/309

(56) References Cited

U.S. PATENT DOCUMENTS

| 4,270,838 | A | | 6/1981 | Furusawa et al. | |
| 5,540,958 | A | * | 7/1996 | Bothra et al. | 427/535 |
| 5,702,822 | A | * | 12/1997 | Terui et al. | 428/446 |
| 5,753,911 | A | * | 5/1998 | Yasuda et al. | 250/306 |
| 6,013,573 | A | * | 1/2000 | Yagi | 438/619 |

FOREIGN PATENT DOCUMENTS

JP 57-53925 11/1982

* cited by examiner

Primary Examiner—Mark A. Robinson
(74) Attorney, Agent, or Firm—Frishauf, Holtz, Goodman, Langer & Chick, P.C.

(57) ABSTRACT

A micromanipulator having a high-stiffness manipulation probe capable of carrying out a manipulation process in the view range of a microscope without modifying an existing observation optical system. The micromanipulator comprises a manipulation probe protruding from a probe supporting member, which is connectedly supported on a transfer control device by means of a hold member. The manipulation probe can be moved (e.g., translated or rotated) for a desired stroke in a desired direction by driving the transfer control device to move the probe supporting member finely.

20 Claims, 6 Drawing Sheets

MICROMANIPULATOR

BACKGROUND OF THE INVENTION

The present invention relates to a micromanipulator for microscopically manipulating an infinitesimal sample, for example.

Figure 11:
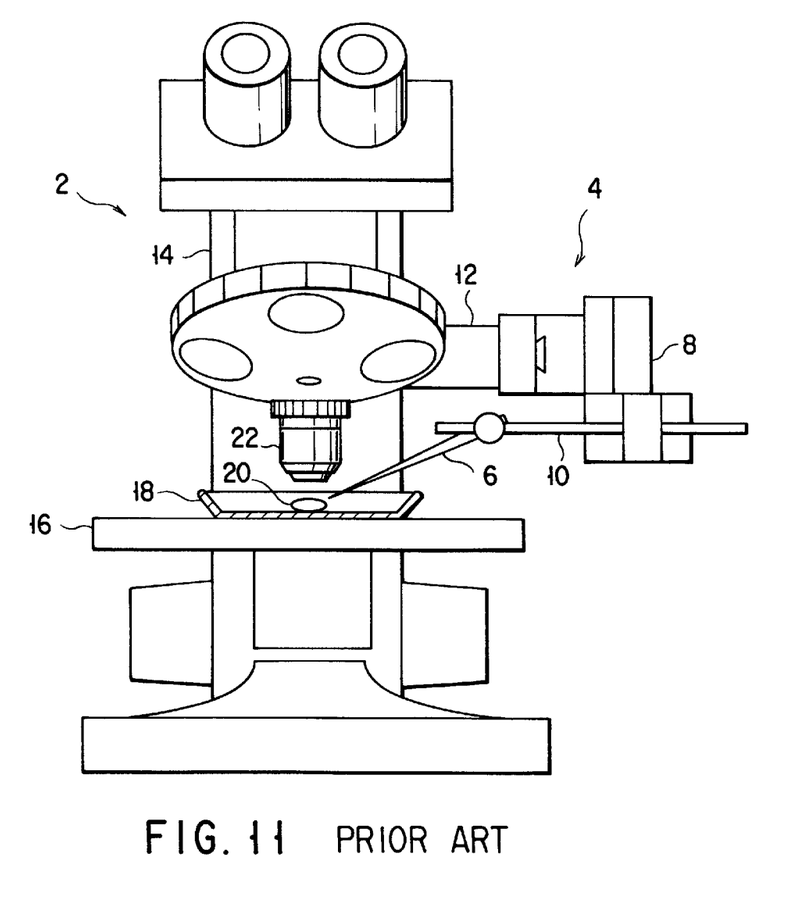
FIG. 11 is a view showing a first prior art micromanipulator incorporated in a microscope system.

Conventionally known is a micromanipulator 4 (hereinafter referred to as a first prior art) that is incorporated in a microscope system 2, as shown in FIG. 11, for example.

The first prior art micromanipulator 4 comprises a rod- or needle-shaped manipulation probe 6 and a transfer control device 8, which can move the probe 6 in a given direction and locate it in a given position. The manipulation probe 6 is supported on the control device 8 by means of a mounting holder 10. The micromanipulator 4 is attached to a microscope body 14 by means of a manipulator fixing member 12.

According to this micromanipulator 4, the manipulation probe 6 is operated for a sample (e.g., cell, fertilized edge, etc.) 20 in a vessel 18 that is placed on a microscope stage 16. By doing this, the sample 20 is situated in the view range of an objective lens 22, or the sample 20 in the view range of the lens 22 is reoriented.

Figure 12:
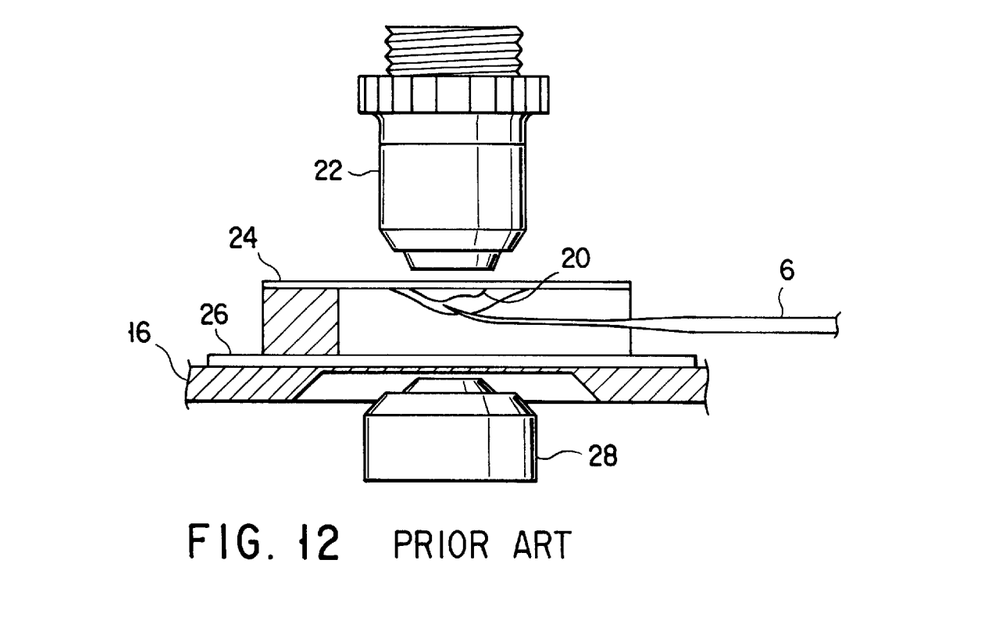
FIG. 12 is a partial sectional view showing a state in which a manipulation probe of the first prior art is inserted in a narrow working space.

Supposedly, the manipulation probe 6 of the first prior art may be positioned with respect to the sample 20 that adheres to the inside of a transparent frame 24, as shown in FIG. 12, for example, or the probe 6 may be inserted into the view range of the high-magnification objective lens 22 whose working distance is short. Usually, therefore, the distal end of the manipulation probe 6 is sharp and elongated so that the probe 6 can be inserted securely and smoothly into the narrow working space.

Illumination light from a condenser lens 28 opposed to a transparent plate 26 that constitutes the frame 24, for example, is applied to the sample 20 and the manipulation probe 6 in the working space with the probe 6 in the frame 24. By doing this, the sample 20 and the manipulation probe 6 can be observed microscopically as the sample 20 is manipulated by means of the probe 6.

Described in Jpn. Pat. Appln. KOKOKU Publication No. 57-53925, moreover, is a micromanipulator 4 (hereinafter referred to as a second prior art) that is incorporated integrally in a condenser lens 28, as shown in FIG. 13, for example.

Figure 13:
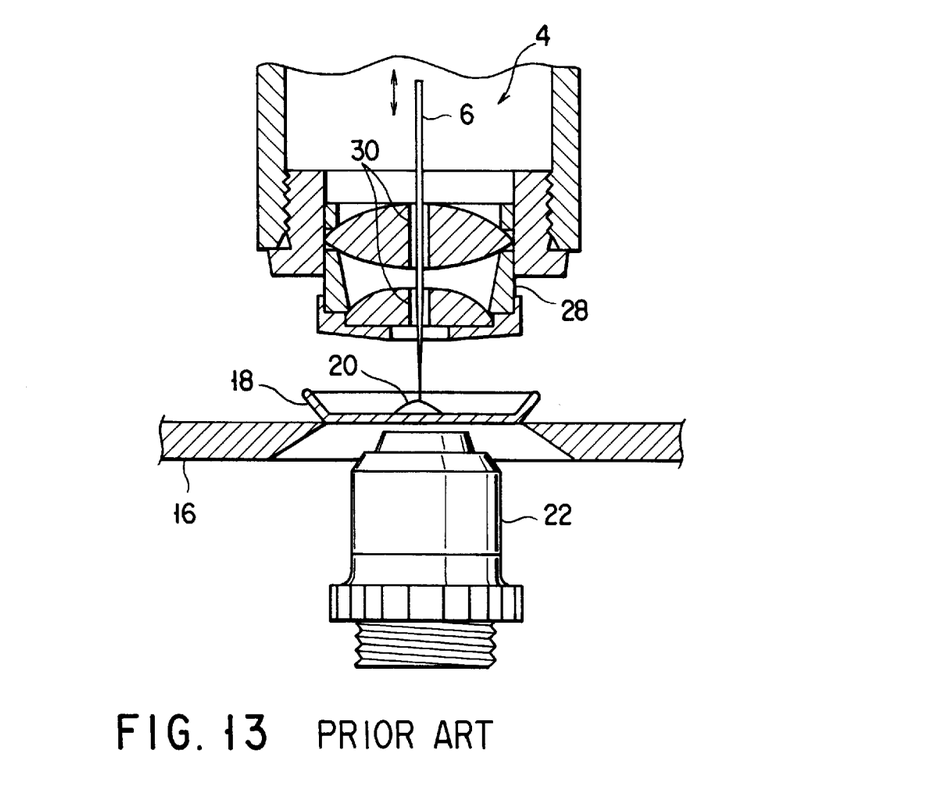
FIG. 13 is a sectional view showing an arrangement of a second prior art micromanipulator.

The second prior art micromanipulator 4 comprises a manipulation probe 6, which is passed through holes 30 in the condenser lens 28 and can move up and down in the direction of the arrow in FIG. 13 along the optical axis of the objective lens 22.

According to this micromanipulator 4, the manipulation probe 6 itself or the condenser lens 28 is moved up and down to subject the sample 20 in the vessel 18 on the microscope stage 16 to a predetermined manipulation process.

Since the elongated manipulation probe 6 having a sharp distal end is used in the first prior art, however, the following problems will arise if the stiffness of the probe 6 is lowered. For example, the manipulating capability may lessen due to interaction between the manipulation probe 6 and the sample 20, and the positioning accuracy may lower as the deflection of the probe 6 increases. If the probe 6 moves suddenly as it is subjected to accumulation and release of elastic strain energy, moreover, the probe 6 and the sample 20 may be destroyed, or the sample 20 may get out of the view range of the objective lens 22.

Since the condenser lens 28 having the holes 30 bored therein is used in the second prior art, on the other hand, a boring process for the lens 28 is required additionally, and besides, the presence of the holes 30 in the lens 28 has a bad influence upon the effect of screening from the optical system or the like. Further, a position adjusting mechanism (not shown) for the condenser lens 28 is utilized in moving the manipulation probe 6 of the micromanipulator 4 within the view range. In order to maintain good adjustment of illumination light, however, it is not adjustment of illumination light, however, it is not advisable to change the position of the condenser lens 28. In the case where the lens 28 is fixed in a satisfactory adjustment position, furthermore, it should be bored with relatively large holes 30 to allow the manipulation probe 6 to move therein. However, enlarging the holes 30 exerts an additional bad influence upon the effect of screening from the optical system or the like.

BRIEF SUMMARY OF THE INVENTION

The object of the present invention is to provide a micromanipulator having a high-stiffness manipulation probe capable of carrying out a manipulation process in the view range of a microscope without modifying an existing observation optical system.

In order to achieve the above object, a micromanipulator according to the present invention for manipulating a sample in the view range of a microscope, comprises a high-stiffness manipulation probe and a probe supporting member supporting and operating the manipulation probe.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Micromanipulators according to various embodiments of the present invention will now be described with reference to the accompanying drawings.

For each of the embodiments mentioned later, a micromanipulator is supposed to be incorporated in the aforementioned microscope system 2 (see FIG. 11). Since this microscope system 2 is constructed in the same manner as the prior art systems, only some features of the micromanipulator will be described for each of the following embodiments.

In the description of the individual embodiments to follow, like portions that are included in each of the aforementioned prior art systems are designated by like reference numerals for simplicity.

Figure 1:
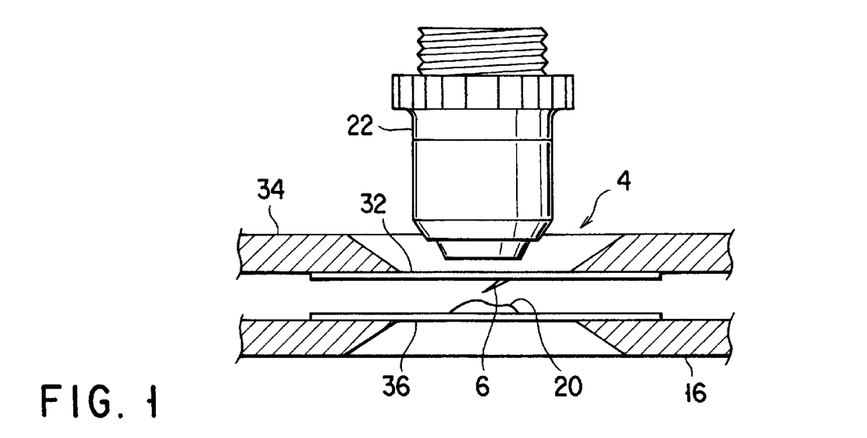
FIG. 1 is a partial sectional view showing an arrangement of a micromanipulator according to a first embodiment of the present invention.

FIG. 1 shows an arrangement of a micromanipulator 4 according to a first embodiment of the present invention.

As shown in FIG. 1, the micromanipulator 4 according to the present embodiment comprises a manipulation probe 6 that protrudes from a probe supporting member 32 (transparent flat plate according to the present embodiment). The supporting member 32 is connected to a transfer control device (see the device 8 of FIG. 11) by means of a hold member 34. The manipulation probe 6 can be moved (e.g., translated or rotated) for a desired stroke in a desired direction by driving the transfer control device to move the probe supporting member 32 finely.

The probe supporting member 32 is a flat plate of a transparent material such as glass, silicon nitride, etc. It measures several millimeters to ten-odd millimeters square and is hundreds of micrometers to about 0.5 millimeter thick.

The manipulation probe 6 can be formed by, for example, drawing out a glass material, subjecting a silicone material to anisotropic etching, or subjecting a metallic material to electropolishing. By this treatment process, the manipulation probe 6 can be designed so that its distal end diameter and length are tens of micrometers and hundreds of micrometers, respectively. In the present invention, the probe 6 should preferably have an aspect ratio less than one thousand. It should be noted that the aspect ratio is defined by the length of the probe 6 divided by the minimum width of the probe 6.

Further, the manipulation probe 6 is bonded to the probe supporting member 32 by a predetermined bonding process. In this case, the probe 6 may be bonded to the surface of the supporting member 32, molded integrally with the member 32, or formed on the surface of the member 32 by the optical shaping method, atomic depositing method, etc.

Preferably, the hold member 34 should be formed of, for example, a metallic material with a thickness of hundreds of micrometers to several millimeters such that it can satisfactorily maintain its stiffness and the thickness of its portion interfering with an objective lens 22 is smaller than the working distance of the lens 22.

A sample 20 is supported on a sample supporting member 36 that is placed on a microscope stage 16. The sample 20 can be slid in a desired direction by moving the supporting member 36 by means of the stage 16. Preferably, the sample supporting member 36 should be formed of, for example, a metallic material with a thickness of several millimeters such that it can satisfactorily maintain its stiffness.

According to the present embodiment, the objective lens 22 is underlain successively by the probe supporting member 32, from which the manipulation probe 6 protrudes, and the sample supporting member 36 that supports the sample 20.

The following is a description of an example of the operation of the present embodiment.

First, the microscope stage 16 is driven to set the sample supporting member 36 within the range of the working distance (0.3 millimeter to several millimeters) of the objective lens 22. Further, the stage 16 is driven to position the sample 20, which is supported on the supporting member 36, within the view range of the lens 22.

Then, the probe supporting member 32 is finely moved by means of the transfer control device (see FIG. 11) to translate or rotate the manipulation probe 6 for a desired stroke in a desired direction. Thereafter, the distal end of the probe 6 is, for example, positioned opposite to the sample 20. As this is done, the distal end of the probe 6 and the sample 20 are situated within the view range of the objective lens 22.

Preferably, the probe supporting member 32 should be also finely moved by means of the transfer control device to adjust the position, attitude, etc. of the manipulation probe 6 with respect to the view range of the objective lens 22 and the sample 20, depending on the object of operation or working conditions.

The sample 20 can be subjected to a desired manipulation process by further finely moving the probe supporting member 32 to translate or rotate the manipulation probe 6 in a manner such that the distal end of the probe 6 and the sample 20 are microscopically observing through the objective lens 22.

Thus, according to the present embodiment, the manipulation probe 6 having a length of hundreds of micrometers is formed, in place of the conventional elongate manipulation probe 6, protruding from the surface of the transparent probe supporting member 32. In consequence, the probe 6 can maintain its high stiffness as it is operated to manipulate the sample 20 that is situated in the view range of the high-magnification objective lens 22 with a short working distance.

Since the manipulation probe 6 is formed protruding from the surface of the transparent probe supporting member 32, moreover, the microscopic observation and manipulation of the sample 20 can be simultaneously carried out in the view range of the high-magnification short-distance objective lens 22 without modifying the existing observation optical system.

Since the manipulation probe 6 is supported by means of the thin transparent probe supporting member 32, moreover, the high-magnification short-distance objective lens 22 can be brought close to the sample 20. Accordingly, the sample 20, the relative positions of the sample 20 and the distal end of the manipulation probe 6, etc. can be observed with high resolution.

In the embodiment described above, the distal end of the manipulation probe 6 is positioned with respect to the sample 20 by finely moving the probe supporting member 32. Alternatively, however, the sample 20 may be positioned with respect to the distal end of the probe 6 by being moved relatively to the probe 6 and the objective lens 22 with the sample supporting member 36 connected to the transfer control device.

In the description of the individual embodiments to follow, like portions that are included in the system according to the first embodiment are designated by like reference numerals for simplicity.

A micromanipulator according to a second embodiment of the invention will now be described with reference to FIG. 2.

In the first embodiment described above, the objective lens 22 is underlain successively by the probe supporting member 32, from which the manipulation probe 6 protrudes, and the sample supporting member 36 that supports the sample 20. According to the second embodiment, however, an objective lens 22 is overlain successively by a sample supporting member 36, which supports the sample 20, and a probe supporting member 32 from which a manipulation probe 6 protrudes, as shown in FIG. 2.

Preferably, in this case, the sample supporting member 36 should be formed of a transparent member, e.g., glass, having a thickness large enough to maintain its stiffness and smaller than the working distance of the objective lens 22.

In the present embodiment, moreover, it is necessary only that the sample supporting member 36 be transparent, and the probe supporting member 32 need not always be transparent.

With this arrangement, the sample 20 can be brought closer to the short-distance objective lens 22, so that the lens 22 used can enjoy a higher magnification, thus ensuring high-resolution observation.

For other functions and effects, the second embodiment resembles the first embodiment, so that a description of those particulars is omitted.

A micromanipulator according to a third embodiment of the invention will now be described with reference to FIG. 3.

Figure 3:
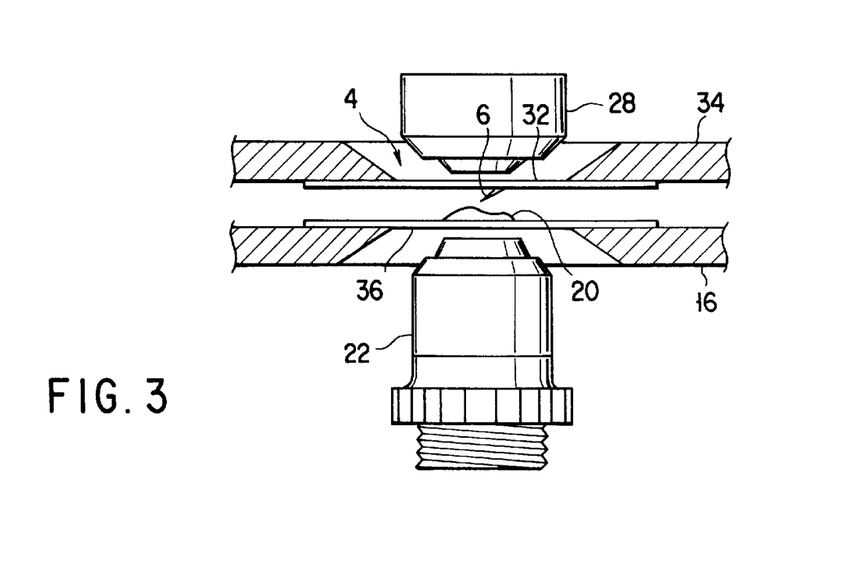
FIG. 3 is a partial sectional view showing an arrangement of a micromanipulator according to a third embodiment of the invention.

The present embodiment is an improved version of the second embodiment, in which a condenser lens 28 for illuminating the view range is additionally provided opposite to an objective lens 22, outside a probe supporting member 32, as shown in FIG. 3.

According to this arrangement, a manipulation probe 6 can be positioned or moved without using a position adjusting mechanism (not shown) for the condenser lens 28 (or without modifying an existing observation optical system). Accordingly, the position of the lens 28 can be kept fixed without any change during observation and manipulation. Thus, illumination light can be adjusted satisfactorily, so that high-resolution observation can be effected.

For other functions and effects, the third embodiment resembles the first embodiment, so that a description of those particulars is omitted.

A micromanipulator according to a fourth embodiment of the invention will now be described with reference to FIGS. 4A, 4B and 4C.

Figures 4A, 4B, 4C:
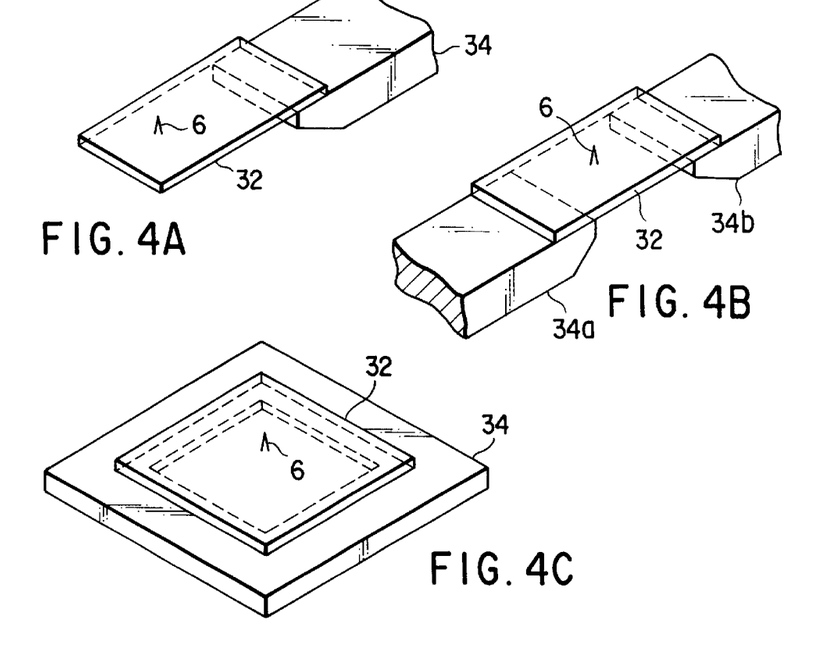
FIG. 4A is a perspective view showing an arrangement of a micromanipulator according to a fourth embodiment of the invention, in which one side of a probe supporting member is supported like a cantilever by means of a hold member.
FIG. 4B is a perspective view showing an arrangement of the micromanipulator according to the fourth embodiment of the invention, in which a probe supporting member is supported from both sides by means of two hold members.
FIG. 4C is a perspective view showing an arrangement of the micromanipulator according to the fourth embodiment of the invention, in which the peripheral edge portion of a probe supporting member is supported by means of a hold member having the shape of a hollow frame.

The present embodiment relates to an improvement of the hold member 34 for supporting the probe supporting member 32, as shown in FIGS. 4A, 4B and 4C. For other arrangements, functions, and effects, the fourth embodiment resembles the first to third embodiments, so that only improved portions will be described in the following.

FIG. 4A shows a case in which one side of a probe supporting member 32 is supported like a cantilever by means of one hold member 34, and FIG. 4B shows a case in which a probe supporting member 32 is supported from both sides by means of two hold members 34a and 34b. FIG. 4C shows a case in which the peripheral edge portion of a probe supporting member 32 is supported by means of a hold member 34 having the shape of a hollow frame.

According to these arrangements, especially in the cases of the supporting methods shown in FIGS. 4B and 4C, the opposite sides or periphery of the probe supporting member 32 can be supported, so that distortion of the supporting member 32 attributable to its own elastic deformation can be reduced. In consequence, the manipulating force, stiffness, etc. of the manipulation probe 6 can be improved.

It is to be understood that the supporting methods described above can be also applied to the sample supporting member 36 for supporting the sample 20.

A micromanipulator according to a fifth embodiment of the invention will now be described with reference to FIGS. 5A, 5B and 5C.

Figures 5A, 5B, 5C:
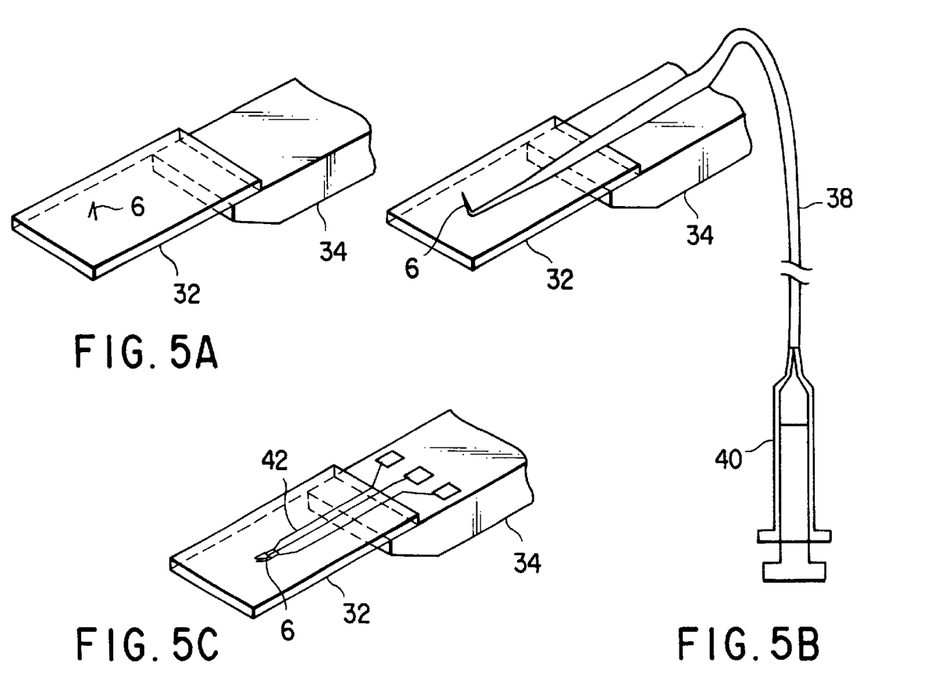
FIG. 5A is a perspective view showing an arrangement of a micromanipulator according to a fifth embodiment of the invention, in which a needle-shaped manipulation probe is formed protruding from the surface of a probe supporting member supported like a cantilever.
FIG. 5B is a perspective view showing an arrangement of the micromanipulator according to the fifth embodiment of the invention, in which a syringe is internally connected to a manipulation probe in the form of a hollow pipette by means of a duct.
FIG. 5C is a perspective view showing an arrangement of the micromanipulator according to the fifth embodiment of the invention, in which a drive mechanism is used to move a manipulation probe in the form of a micro-gripper.

The present embodiment relates to an improvement of the manipulation probe 6, as shown in FIGS. 5A, 5B and 5C. For other arrangements, functions, and effects, the fifth embodiment resembles the first to third embodiments, so that only improved portions will be described in the following.

FIG. 5A shows a case in which a needle-shaped manipulation probe 6 is formed protruding from the surface of a probe supporting member 32 that is supported like a cantilever, and FIG. 5B shows a case in which a syringe 40 is internally connected to a manipulation probe 6 in the form of a hollow pipette by means of a duct 38. FIG. 5C shows a case in which a drive mechanism (not shown) is used to move a manipulation probe 6 in the form of a micro-gripper that is movable with respect to a probe supporting member 32, and a transparent wiring pattern 42 is provided for driving energy supply.

Figure 2:
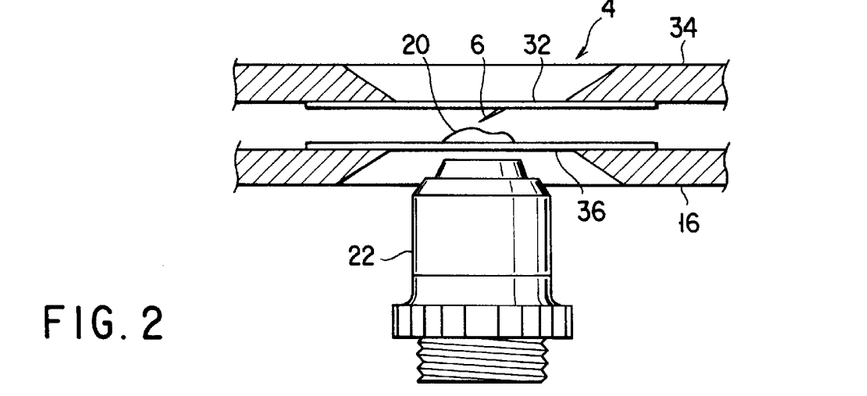
FIG. 2 is a partial sectional view showing an arrangement of a micromanipulator according to a second embodiment of the invention.

The needle-shaped manipulation probe 6 (see FIG. 5A) can push, shave, or bore the sample 20 (see FIGS. 1 to 3).

The hollow pipette-shaped manipulation probe 6 (see FIG. 5B) can attract the sample 20 (or extract the contents of the sample 20) with the aid of the syringe 40 for sucking operation or injects a liquid from the syringe 40 into the sample 20.

The gripper-shaped manipulation probe 6 (see FIG. 5C) can grasp the sample 20 in a manner such that a predetermined voltage is applied to the transparent wiring pattern 42 to urge the probe 6 for gripping operation.

A micromanipulator according to a sixth embodiment of the invention will now be described with reference to FIGS. 6A and 6B.

Figure 6A:
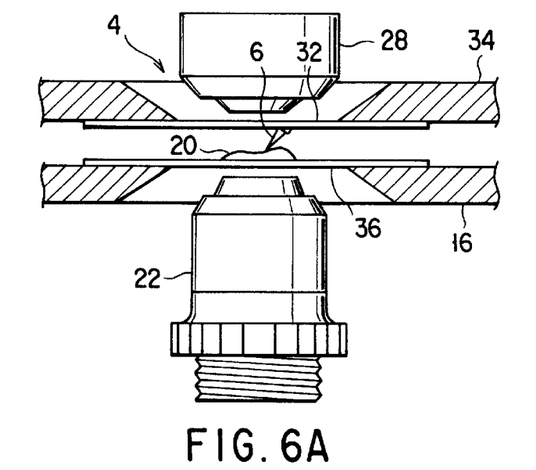
FIG. 6A a partial sectional view showing an arrangement of a micromanipulator according to a sixth embodiment of the invention.
Figure 6B:
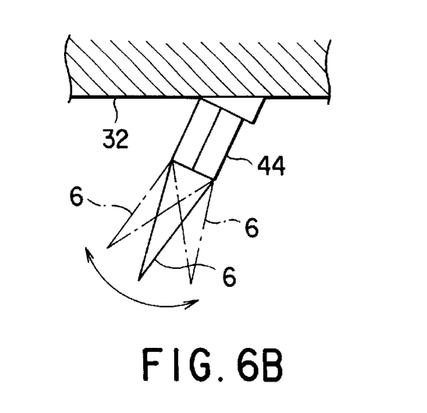
FIG. 6B is a partial sectional view showing a state in which a manipulation probe is vibrated or bent.

The present embodiment relates to an improvement of the manipulation probe 6, as shown in FIGS. 6A and 6B. For other arrangements, functions, and effects, the sixth embodiment resembles the first to third embodiments, so that only improved portions will be described in the following.

A manipulation probe 6 is supported on a probe supporting member 32 by means of a drive member 44 that is formed of, for example, a bimorph-type piezoelectric device or shape memory alloy. The probe 6 can be vibrated or bent in the direction of arrow in FIG. 6B by applying a predetermined voltage to the drive member 44.

With this arrangement, the manipulation probe 6 can be operated independently for the sample 20 (see FIGS. 1 to 3). In consequence, the sample 20 can be subjected to finer, more sophisticated manipulation.

In the present embodiment, a probe supporting member 32 need not always be transparent unless it is provided on the side of an objective lens 22 or condenser lens 28.

A micromanipulator according to a seventh embodiment of the invention will now be described with reference to FIG. 7.

Figure 7:
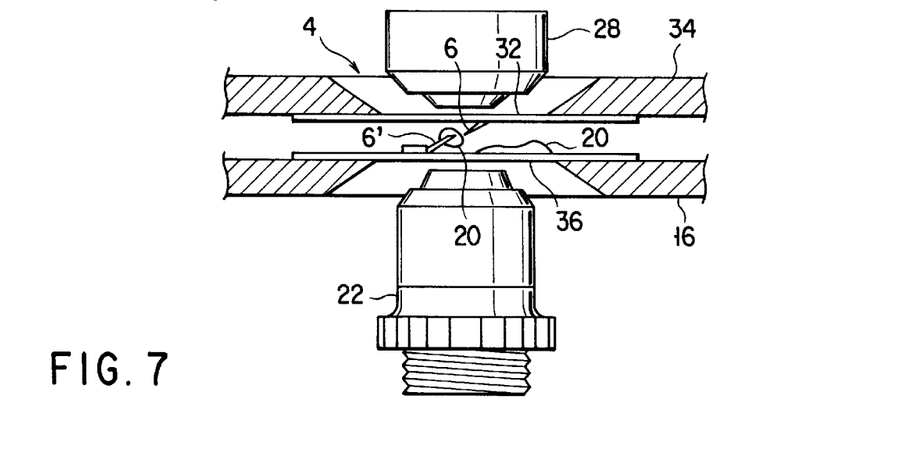
FIG. 7 is a partial sectional view showing an arrangement of a micromanipulator according to a seventh embodiment of the invention.

As shown in FIG. 7, the micromanipulator 4 according to the present embodiment is provided with an auxiliary manipulation probe 6' designed to grasp the sample 20, as well as a manipulation probe 6. According to this embodiment, the probe 6' is formed protruding from the surface of a sample supporting member 36, for example.

With this arrangement, the sample 20 can be grasped by means of the auxiliary manipulation probe 6' as the microscope stage 16 is moved, so that it can be held securely and smoothly in position. In consequence, the manipulation probe 6 can be operated steadily and securely for the sample 20.

In the present embodiment, a probe supporting member 32 need not always be transparent unless it is provided on the side of an objective lens 22 or condenser lens 28.

For other arrangements, functions, and effects, the seventh embodiment resembles the first to third embodiments, so that a description of those particulars is omitted.

A micromanipulator according to an eighth embodiment of the invention will now be described with reference to FIG. 8.

Figure 8:
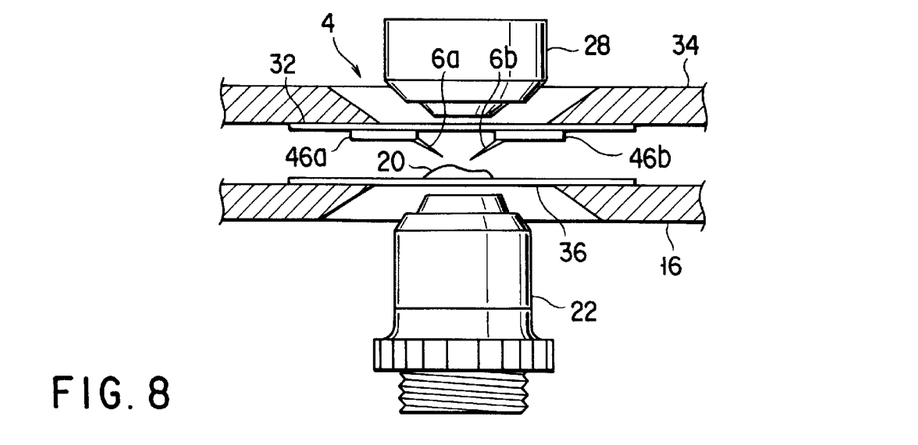
FIG. 8 is a partial sectional view showing an arrangement of a micromanipulator according to an eighth embodiment of the invention.

As shown in FIG. 8, the micromanipulator 4 according to the present embodiment is provided with a plurality of manipulation probes that can be moved by means of moving mechanisms.

By way of example, first and second manipulation probes 6a and 6b are supported on a probe supporting member 32 by means of first and second moving mechanisms 46a and 46b, respectively.

The first and second manipulation probes 6a and 6b can be moved (e.g., translated or rotated) simultaneously or alternatively for a given stroke in a given direction by suitably applying a predetermined voltage from an electrode grid (not shown) on the surface of the probe supporting member 32 to the first and second moving mechanisms 46a and 46b.

With this arrangement, fine movement of the probe supporting member 32 and the operation of the first and second manipulation probes 6a and 6b are controlled so that cooperative manipulation of the sample 20 by means of the probes 6a and 6b can be effected.

In the present embodiment, the probe supporting member 32 and the electrode grid need not always be transparent unless they are provided on the side of an objective lens 22 or condenser lens 28.

For other arrangements, functions, and effects, the eighth embodiment resembles the first to third embodiments, so that a description of those particulars is omitted.

A micromanipulator according to a ninth embodiment of the invention will now be described with reference to FIGS. 9A and 9B.

Figure 9A:
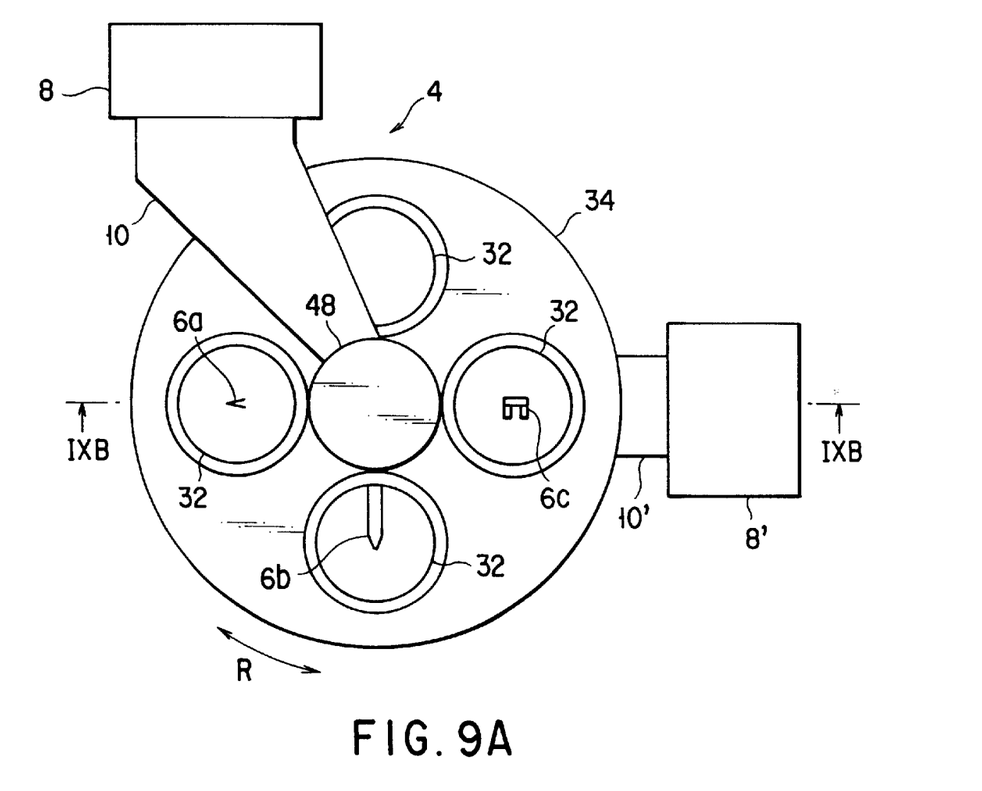
FIG. 9A is a plan view showing an arrangement of a micromanipulator according to a ninth embodiment of the invention.
Figure 9B:
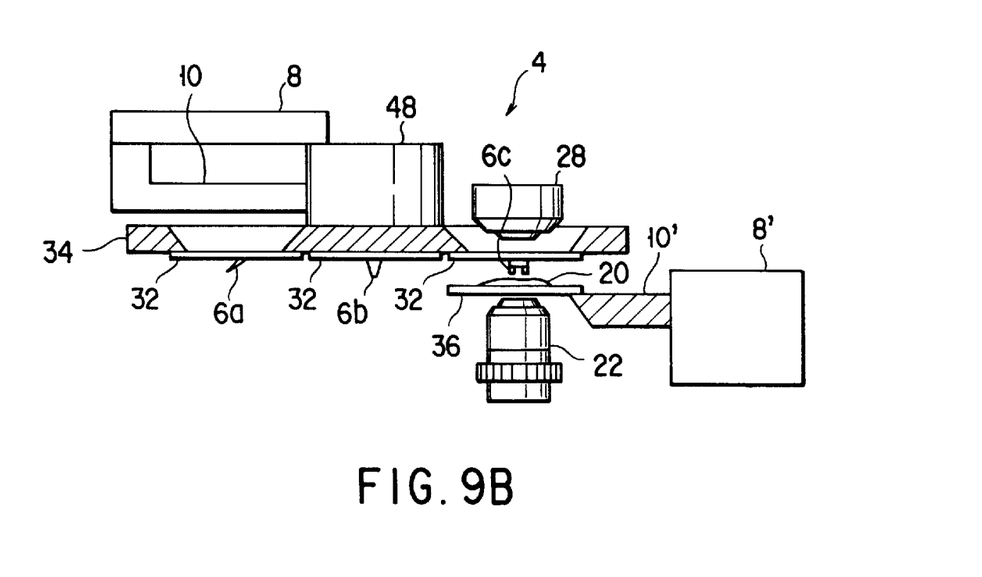
FIG. 9B is a sectional view taken along line IXB—IXB of FIG. 9A.

In the micromanipulator 4 of the present embodiment, as shown in FIGS. 9A and 9B, a hold member 34 is substantially in the form of a disk, which can be rotated for a given stroke in a given direction R by means of a rotating mechanism 48. The mechanism 48 is supported on the transfer control device 8 by means of a mounting holder 10.

The discoid hold member 34 is fitted with a plurality of probe supporting members (e.g., transparent flat plates) 32 that are arranged substantially concentrically at regular intervals. Manipulation probes 6a, 6b and 6c of different types are supported on the supporting members 32, individually.

In the present embodiment, the manipulation probe 6a is a needle-shaped probe, the manipulation probe 6b is a probe in the form of a hollow pipette (having the same function as the manipulation probe 6 shown in FIG. 5B), and manipulation probe 6c is a probe in the form of a micro-gripper (having the same function as the manipulation probe 6 shown in FIG. 5C), for example.

In the present embodiment, moreover, a transparent sample supporting member 36 is opposed to an objective lens 22. The member 36 is supported on a transfer control device 8' by means of a mounting holder 10'.

In positioning any one of the manipulation probes 6a, 6b and 6c with respect to the sample 20 and the view range of the objective lens 22, with this arrangement, a condenser lens 28 is moved to keep away from the hold member 34, and the member 34 is then rotated for the given stroke in the given direction R by means of the rotating mechanism 48, whereupon the respective positions of the probes 6a, 6b and 6c are shifted.

Let it now be supposed that the manipulation probe 6c is positioned with respect to the sample 20 and the view range of the objective lens 22.

If the transfer control device 8 is then driven, a driving force is generated and transmitted to the rotating mechanism 48 through the mounting holder 10, thereby moving (finely moving) the mechanism 48 itself to a desired extend in a desired direction. At the same time, the hold member 34, which is rotatably supported on the rotating mechanism 48, also moves finely, thereby causing the manipulation probe 6c on its corresponding probe supporting member 32 to translate or rotate.

If the transfer control device 8' is driven at the same time or at a given time, a driving force is generated and transmitted to the sample supporting member 36 through the mounting holder 10', thereby moving (finely moving) the member 36 to a desired extend in a desired direction. In consequence, the sample 20 supported on the supporting member 36 translates or rotates.

As the relative translation and rotation of the manipulation probe 6c and the sample 20 are controlled through this fine movement operation, the process for the manipulation probe 6c to manipulate (e.g., grasp) the sample 20 is carried out.

According to the present embodiment, the respective positions of the manipulation probes 6a, 6b and 6c can be changed easily and quickly by only moving the hold member 34, which carries thereon the probe supporting members 32 for supporting the manipulation probes 6a, 6b and 6c, for a given stroke in a given direction. In this embodiment, the probe supporting members 32 are arranged on the substantially disk-shaped hold member 34, and the manipulation probes 6a, 6b and 6c of different types are provided individually on the supporting members 32. Alternatively, however, the manipulation probes 6a, 6b and 6c of different types may be arranged on a substantially disk-shaped probe supporting member 32 so that they can be changed by rotating the member 32.

For other functions and effects, the ninth embodiment resembles the first to third embodiments, so that a description of those particulars is omitted.

Although the hold member 34 is substantially circular in the present embodiment, it may alternatively be formed substantially having the shape of a cross or trident. Further, the probe supporting members 32 individually having the manipulation probes 6a, 6b and 6c of different types bonded thereon may be arranged in series on a rectangular hold member 34, for example. In this case, the manipulation probes 6a, 6b and 6c can be replaced with one another by translating the hold member 34.

In the present embodiment, the probe supporting members 32 need not always be transparent unless they are provided on the side of an objective lens 22 or condenser lens 28.

A micromanipulator according to a tenth embodiment of the invention will now be described with reference to FIG. 10.

Figure 10:
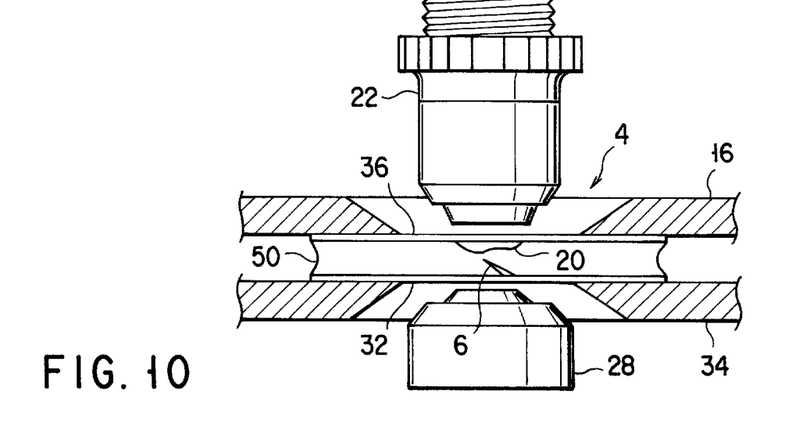
FIG. 10 is a partial sectional view showing an arrangement of a micromanipulator according to a tenth embodiment of the invention.

In the present embodiment, as shown in FIG. 10, a space between a probe supporting member 32 and a sample supporting member 36 is filled up with a liquid 50 (e.g., water, oil, etc.).

According to this arrangement, the surface of the liquid 50 is forced to be flat by the probe supporting member 32 and the sample supporting member 36, so that harmful refraction of illumination light from a condenser lens 28 and light incident upon an objective lens 22 can be restrained. Since the space between the supporting members 32 and 36 is filled with the liquid 50, moreover, lenses with higher aperture ratios, e.g., oil-immersed lenses, can be used as the lenses 22 and 28. Since the sample 20 is isolated from the open air by the liquid 50, moreover, a desired manipulation process can be securely carried out without lowering the stiffness of a manipulation probe 6 and without allowing the sample 20 to dry up.

For other functions and effects, the tenth embodiment resembles the first to third embodiments, so that a description of those particulars is omitted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A micromanipulator for manipulating a sample on a sample supporting member in a view range of a microscope, wherein the microscope includes an objective lens and a condenser lens, and the sample supporting member is disposed between the objective lens and the condenser lens, said micromanipulator comprising:
   a high-stiffness manipulation probe; and
   a probe supporting member which has a surface that supports the manipulation probe;
   wherein said probe supporting member comprises a flat plate of transparent material and is disposed between the sample supporting member and one of the objective lens and the condenser lens.

2. A micromanipulator according to claim 1, wherein said probe supporting member has a size such that the manipulation probe can be supported in the view range of the microscope.

3. A micromanipulator according to claim 1, wherein said probe supporting member is movably supported by a high-stiffness hold member.

4. A micromanipulator according to claim 3, wherein said hold member supports different portions of the probe supporting member.

5. A micromanipulator according to claim 3, wherein said hold member supports a peripheral edge portion of the probe supporting member.

6. A micromanipulator according to claim 3, wherein said hold member carries thereon a plurality of probe supporting members each of which supports the manipulation probe so that a position of the manipulation probe can be changed by moving the hold member for a given stroke in a given direction.

7. A micromanipulator according to claim 1, further comprising a drive mechanism for moving the manipulation probe with respect to the probe supporting member.

8. A micromanipulator according to claim 1, wherein said sample is supported on the probe supporting member, and said probe supporting member is provided with an auxiliary manipulation probe for grasping the sample.

9. A micromanipulator according to claim 1, wherein said manipulation probe comprises a tube having a distal end opening.

10. A micromanipulator according to claim 1, wherein a plurality of manipulation probes and a plurality of probe moving mechanisms are supported on the probe supporting member, and the probe moving mechanisms respectively move the manipulation probes with respect to the probe supporting member.

11. A micromanipulator for manipulating a sample on a sample supporting member in a view range of a microscope, wherein the microscope includes an objective lens and a condenser lens, and the sample supporting member is disposed between the objective lens and the condenser lens, said micromanipulator comprising:
   a manipulation probe having an aspect ratio less than one thousand; and a probe supporting member which has a surface that supports the manipulation probe;

wherein said probe supporting member comprises a flat plate of transparent material and is disposed between the sample supporting member and one of the objective lens and the condenser lens.

12. A micromanipulator according to claim 11, wherein said probe supporting member has a size such that the manipulation probe can be supported in the view range of the microscope.

13. A micromanipulator according to claim 11, wherein said probe supporting member is movably supported by a high-stiffness hold member.

14. A micromanipulator according to claim 13, wherein said hold member supports different portions of the probe supporting member.

15. A micromanipulator according to claim 13, wherein said hold member supports a peripheral edge portion of the probe supporting member.

16. A micromanipulator according to claim 13, wherein said hold member carries thereon a plurality of probe supporting members each of which supports the manipulation probe so that a position of the manipulation probe can be changed by moving the hold member for a given stroke in a given direction.

17. A micromanipulator according to claim 11, further comprising a drive mechanism for moving the manipulation probe with respect to the probe supporting member.

18. A micromanipulator according to claim 11, wherein said sample is supported on the probe supporting member, and said probe supporting member is provided with an auxiliary manipulation probe for grasping the sample.

19. A micromanipulator according to claim 11, wherein said manipulation probe comprises a tube having a distal end opening.

20. A micromanipulator according to claim 11, wherein a plurality of manipulation probes and a plurality of probe moving mechanisms are supported on the probe supporting member, and the probe moving mechanisms respectively move the manipulation probes with respect to the probe supporting member.

* * * * *